(12) United States Patent
Higashitani et al.

(10) Patent No.: US 10,404,024 B2
(45) Date of Patent: Sep. 3, 2019

(54) METHOD OF MANUFACTURING TERMINAL-FORMED ELECTRIC WIRE

(71) Applicant: Yazaki Corporation, Tokyo (JP)

(72) Inventors: Masanobu Higashitani, Shizuoka (JP); Shigeo Mori, Shizuoka (JP); Takashi Ishihara, Shizuoka (JP); Shigeru Tanaka, Shizuoka (JP); Hiroshi Fujita, Shizuoka (JP); Yoshinori Yamagata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 220 days.

(21) Appl. No.: 15/596,872

(22) Filed: May 16, 2017

(65) Prior Publication Data

US 2017/0338612 A1 Nov. 23, 2017

(30) Foreign Application Priority Data

May 20, 2016 (JP) .................................. 2016-101950

(51) Int. Cl.
*H01R 43/02* (2006.01)
*B23K 1/00* (2006.01)
(Continued)

(52) U.S. Cl.
CPC ........... *H01R 43/02* (2013.01); *B23K 1/0004* (2013.01); *B23K 1/0016* (2013.01);
(Continued)

(58) Field of Classification Search
CPC .. B23K 26/423; B23K 26/342; B23K 1/0016; B23K 11/002; B23K 11/0033;
(Continued)

(56) References Cited

U.S. PATENT DOCUMENTS 4,097,711 A * 6/1978 Banerjee .................. B23K 9/04
219/76.1
4,434,347 A * 2/1984 Kurtz .................. H01L 21/4825
219/56.22
(Continued)

FOREIGN PATENT DOCUMENTS

CN 103081260 A 5/2013
CN 104160557 A 11/2014
(Continued)

OTHER PUBLICATIONS

Chinese Office Action for the related Chinese Patent Application No. 201710353717.8 dated Sep. 19, 2018.
(Continued)

*Primary Examiner* — Craig M Schneider
*Assistant Examiner* — David R Deal
(74) *Attorney, Agent, or Firm* — Kenealy Vaidya LLP

(57) ABSTRACT

A method of manufacturing a terminal-formed electric wire includes a welding member placing process in which at least one welding member formed of metal having a melting point lower than that of a plurality of metal strands included in a core wire is arranged to the core wire of at least a terminal-forming target portion of the electric wire, and a terminal forming process in which the exposed terminal-forming target portion is interposed between first and second electrodes having a shape corresponding to a desired terminal shape, at least the welding member in the terminal-forming target portion is melted by electrically conducting the first and second electrodes while pressing the terminal-forming target portion with the first and second electrodes, and the melted metal is then solidified, so that the terminal-forming target portion is formed as a terminal portion having a desired terminal shape.

2 Claims, 18 Drawing Sheets

(51) Int. Cl.
  *B23K 11/00* (2006.01)
  *B23K 11/11* (2006.01)
  *B23K 101/38* (2006.01)

(52) U.S. Cl.
  CPC ........ *B23K 11/002* (2013.01); *B23K 11/0033* (2013.01); *B23K 11/115* (2013.01); *B23K 2101/38* (2018.08)

(58) Field of Classification Search
  CPC ... B23K 11/115; B23K 2101/38; B33Y 30/00; B33Y 40/00; H01R 43/02
  USPC .......................................................... 219/76
  See application file for complete search history.

(56) References Cited

U.S. PATENT DOCUMENTS

| | | | |
|---|---|---|---|
| 5,191,710 A | 3/1993 | Fujimaki et al. | |
| 6,452,101 B1* | 9/2002 | Haramaki | B23K 11/115 174/74 R |
| 7,048,551 B2* | 5/2006 | Takayama | H01R 4/185 439/67 |
| 7,146,723 B2* | 12/2006 | Schmitt | H01R 4/024 29/860 |
| 7,810,701 B2* | 10/2010 | Nagano | H01L 23/49811 219/56.22 |
| 9,186,741 B2* | 11/2015 | Kumaria | B23K 1/0016 |
| 9,875,985 B2* | 1/2018 | Nah | H01L 24/81 |
| 2013/0139924 A1 | 6/2013 | Nabeta et al. | |
| 2014/0182128 A1* | 7/2014 | Nikkhoo | H05K 13/0015 29/860 |
| 2015/0064050 A1* | 3/2015 | Retze | B22F 3/1055 419/53 |
| 2015/0236494 A1 | 8/2015 | Mori et al. | |
| 2017/0297101 A1* | 10/2017 | Casper | B33Y 10/00 |

FOREIGN PATENT DOCUMENTS

| | | |
|---|---|---|
| CN | 104641426 A | 5/2015 |
| JP | 4-249875 A | 9/1992 |
| JP | 5-190247 A | 7/1993 |
| JP | 2003-86037 A | 3/2003 |
| JP | 2011-23229 A | 2/2011 |

OTHER PUBLICATIONS

Japanese Office Action for the related Japanese Patent Application No. 2016-101950 dated Jun. 26, 2018.
Japanese Office Action for the related Japanese Patent Application No. 2016-101950 dated Sep. 4, 2018.

\* cited by examiner

METHOD OF MANUFACTURING TERMINAL-FORMED ELECTRIC WIRE

CROSS-REFERENCE TO RELATED APPLICATION (S)

The present application claims priority to and incorporates by reference the entire contents of Japanese Patent Application No. 2016-101950 filed in Japan on May 20, 2016.

BACKGROUND OF THE INVENTION

1. Field of the Invention

The present invention relates to a method of manufacturing a terminal-formed electric wire.

2. Description of the Related Art

There is conventionally known a technique relating to a so-called terminal-formed electric wire in which, instead a terminal metal fitting installed in an electric wire, a part of a core wire of the electric wire is formed in a desired terminal shape. In this technique, for example, the core wire is exposed by stripping off a covering of the electric wire, and a terminal-forming target portion of this exposed portion is interposed between a pair of electrodes. In addition, the pair of electrodes are electrically conducted while pressing the terminal-forming target portion with the pair of electrodes. As a result, the core wire of the terminal-forming target portion is melted under pressing and heating. Then, in this technique, the electric conduction to the pair of electrodes is stopped, and the core wire is cooled while maintaining the pressed state, so that solidification of the melted core wire is waited. Here, the pair of electrodes are formed in a shape corresponding to a desired terminal shape. As a result, the terminal-forming target portion is formed in a desired terminal shape. The terminal-formed electric wire in this type is disclosed in, for example, Japanese Patent Application Laid-Open No. 04-249875.

However, in order to execute terminal forming of the core wire, it is necessary to heat the core wire up to a temperature higher than a melting point of the core wire. For this reason, depending on the melting point, the core wire may not be perfectly melted, and therefore there is a possibility that it is difficult to form the desired terminal shape.

SUMMARY OF THE INVENTION

An object of the present invention is to provide a method of manufacturing a terminal-formed electric wire, capable of executing desired terminal forming.

In order to achieve the above mentioned object, a method of manufacturing a terminal-formed electric wire according to one aspect of the present invention includes a welding member placing process in which at least one welding member formed of metal having a melting point lower than that of a plurality of metal strands included in a core wire is arranged to the core wire of at least a terminal-forming target portion of an electric wire; and a terminal forming process in which the exposed terminal-forming target portion is interposed between a pair of electrodes having a shape corresponding to a desired terminal shape, at least the welding member in the terminal-forming target portion is melted by electrically conducting the pair of electrodes while pressing the terminal-forming target portion with the pair of electrodes, and melted metal is solidified by stopping electric conduction to the pair of electrodes. Consequently, the terminal-forming target portion is formed as a terminal portion having the terminal shape.

According to another aspect of the present invention, in the welding member placing process, the welding member may be arranged to interpose the core wire.

According to still another aspect of the present invention, the method may further include a strand dividing process in which the plurality of strands of the terminal-forming target portion are divided into a plurality of strand groups, wherein in the welding member placing process, the strand groups and welding members are arranged alternately.

According to still another aspect of the present invention, in the welding member placing process, the welding member may be inserted between the plurality of strands.

According to still another aspect of the present invention, in the welding member placing process, the welding member may be wound around the core wire.

According to still another aspect of the present invention, in the welding member placing process, a powder-like welding member may be applied to the core wire.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
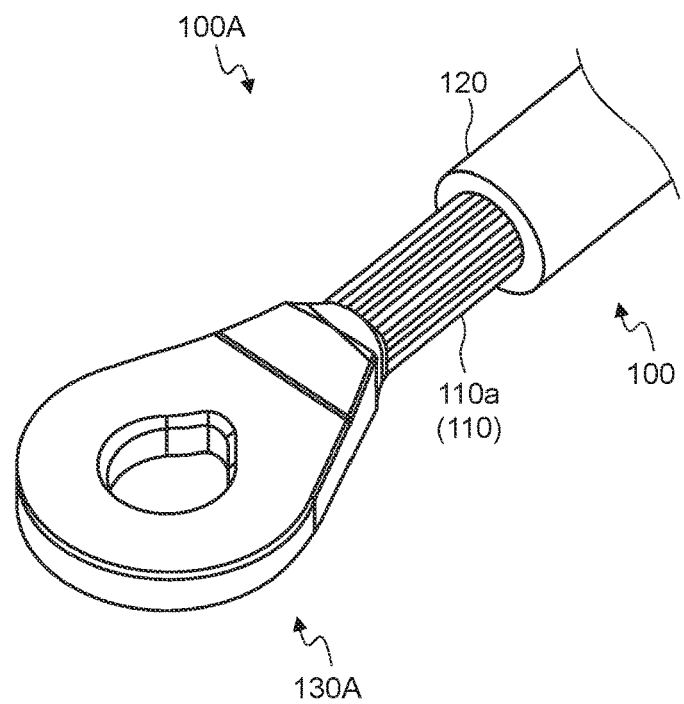
FIG. 1 is a perspective view illustrating a terminal portion of a terminal-formed electric wire.
Figure 2:
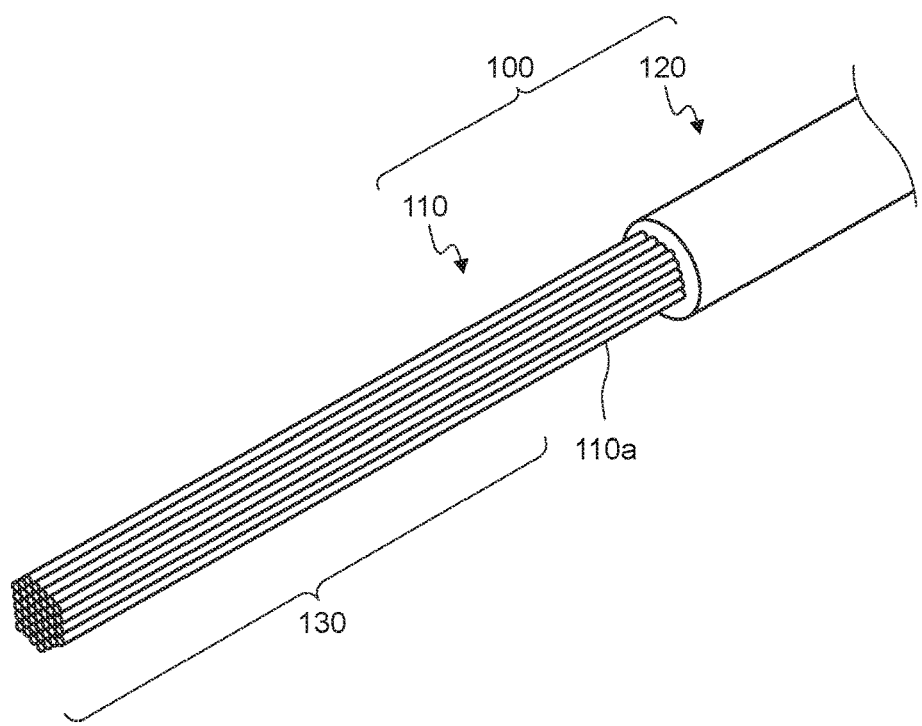
FIG. 2 is a perspective view illustrating a terminal-forming target portion of an electric wire.

A method of manufacturing a terminal-formed electric wire according to an embodiment of the present invention will be described in detail with reference to the accompanying drawings. Note that the present invention is not limited to this embodiment.
Embodiment One embodiment regarding a method of manufacturing a terminal-formed electric wire according to the present invention will be described with reference to FIGS. 1 to 24.

A method of manufacturing the terminal-formed electric wire according to the embodiment is to form a so-called terminal-formed electric wire 100A (FIG. 1) in which a part of a core wire 110 of an electric wire 100 is formed in a desired terminal shape. In the method of manufacturing the terminal-formed electric wire, a terminal-forming target portion 130 is formed as a terminal portion 130A (FIG. 1) having a desired terminal shape by melting and solidifying the terminal-forming target portion 130 (FIG. 2) in an exposed portion of the core wire (a portion where no covering 120 is provided) of the electric wire 100. In the method of manufacturing the terminal-formed electric wire according to the embodiment, it is assumed that the core wire 110 is formed from a plurality of metal strands 110a. This core wire 110 may be formed by simply binding a plurality of strands 110a or may be a twisted wire formed by twisting a plurality of bound strands 110a. In addition, the exposed portion of the core wire of the electric wire 100 may be a portion formed by stripping off the covering 120 that covers the core wire 110 after manufacturing of the electric wire 100 or may be a portion where the covering 120 is not formed during manufacturing of the electric wire 100 through masking or the like. Furthermore, the terminal portion 130A may have any shape such as an eyelets type or a flat type as long as it can be formed.

Figure 3:
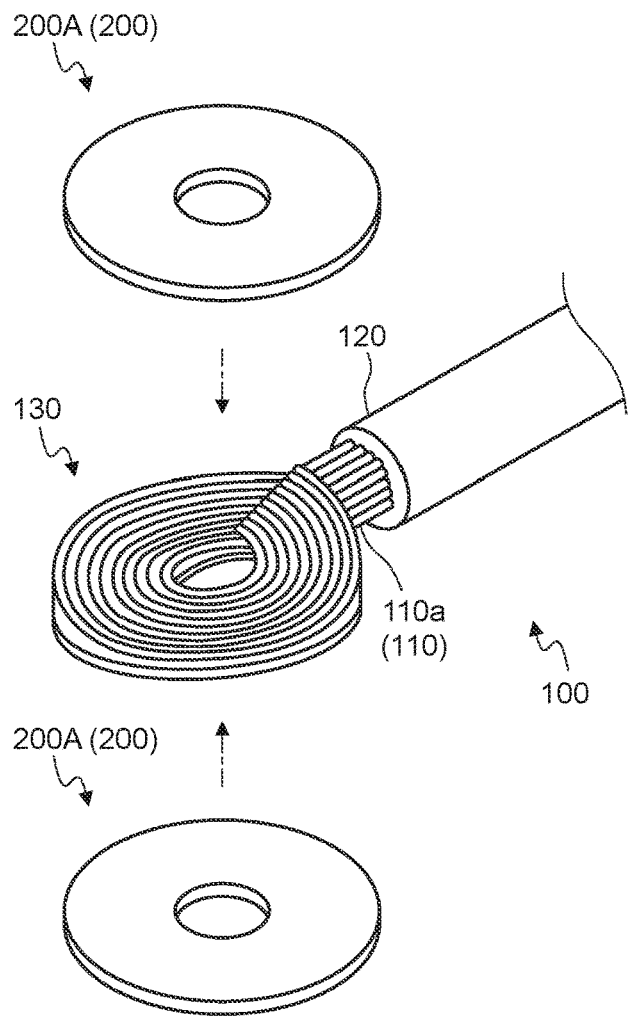
FIG. 3 is a perspective view illustrating a ring-shaped terminal-forming target portion of a temporary shape and a welding member according to an embodiment before placing the welding member.
Figure 4:
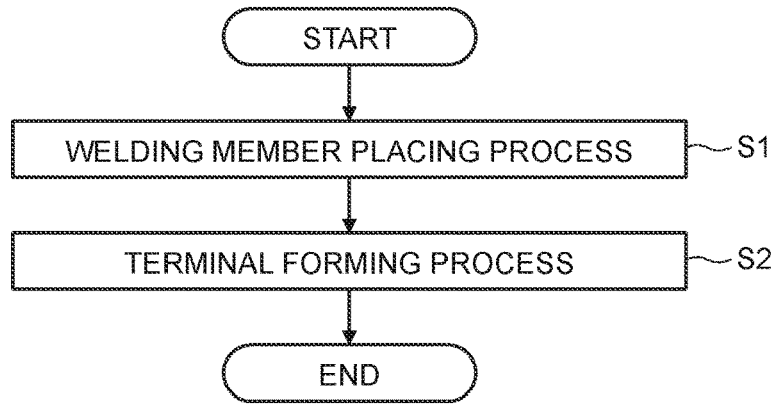
FIG. 4 is a flowchart illustrating a main process in the method of manufacturing the terminal-formed electric wire.

The method of manufacturing the terminal-formed electric wire according to the embodiment at least includes a welding member placing process in which a welding member 200 (FIG. 3) is placed on the core wire 110, and a terminal forming process in which the core wire 110 of the terminal-forming target portion 130 is configured to form a terminal along with the welding member 200. In this method of manufacturing the terminal-formed electric wire, as illustrated in FIG. 4, the welding member placing process is performed (step S1), and the terminal forming process is then performed (step S2).

The welding member 200 is a member formed of metal having a melting point lower than that of metal of a base material of the strands 110a. For example, if the base material of the strand 110a is aluminum or aluminum alloy, the welding member 200 may be formed of zinc having a melting point lower than that of the base material.

Since this welding member 200 is more easily melted than the strand 110a, it can intrude into gaps between the strands 110a along an oxide film on the surface of the base material of the strands 110a even when the strands 110a are not perfectly melted during the terminal forming process (there is a possibility that an oxide film having a higher melting point than that of the base material is formed on the surface of the base material of the strands 110a formed of aluminum or aluminum alloy). For this reason, this welding member 200 can strongly connect the gaps of the solidified strands 110a even when the base material of the strands 110a is not perfectly melted. In addition, it is possible to reduce or remove a cavity between the solidified strands 110a. Therefore, in the terminal portion 130A, it is possible to increase a strength (such as a bonding strength or a tensile strength) by placing the welding member 200 on the core wire 110 of the terminal-forming target portion 130 in advance, compared to a case where only the core wire 110 is formed as a terminal. In addition, since a gap between the strands 110a is filled with the melted welding member 200, if the desired terminal shape is an eyelets type, a seat surface for the terminal portion 130A, which is configured to suppress a recess caused by such as collapse is formed. For this reason, using this eyelets type terminal portion 130A makes it possible to suppress a decrease of an axial force after screw fastening to a counterpart electric connection target and maintain a fastening force with the electric connection target (that is, electric connection state).

Here, as described above, the oxide film is formed on the surface of the base material of the strands 110a regardless of the type of the base material. In the terminal forming process, if the oxide film is formed on the strands 110a, the welding member 200 being melted intrudes from the gap of the oxide film cracked, for example, by thermal expansion or the like, so that the melted base material of the strand 110a and the melted welding member 200 form a solid solution, and the oxide film of the strand 110a rises up. As a result, in the terminal portion 130A, it is possible to increase a bonding area of the strands 110a and improve its strength (such as a bonding strength or a tensile strength) by placing the welding member 200 in the core wire 110 of the terminal-forming target portion 130 in advance even when the oxide film is formed on the strand 110a. In addition, in the terminal portion 130A, since the oxide film can be easily removed, it is possible to reduce a resistance (film resistance), compared to a case where only the core wire 110 is formed.

In this manner, in the method of manufacturing the terminal-formed electric wire according to the present embodiment, the welding member 200 is employed to form a desired terminal portion 130A. In the following description, a specific example of the method of manufacturing the terminal-formed electric wire will be described by focusing on the welding member placing process and the terminal forming process.

In the welding member placing process, at least one welding member 200 is placed for the core wire 110 of at least the terminal-forming target portion 130 of the electric wire 100.

In the welding member placing process according to the present embodiment, the welding member 200 is placed to interpose the core wire 110.

For example, here, it is assumed that an eyelets type terminal portion 130A is formed in the terminal forming process. In the case of this terminal shape, the terminal-forming target portion 130 is formed in a temporary shape of the terminal portion 130A, and the welding member placing process is then performed for the terminal-forming target portion 130 having the temporary shape. Then, the terminal forming process is performed.

First, a process for forming the temporary shape of the terminal portion 130A will be described. In this formation process, a bending process for the terminal-forming target portion 130 and a pre-molding process for the terminal-forming target portion 130 subjected to the bending process are performed.

In order to perform this formation process, if no core wire exposed portion is formed in the process of manufacturing the electric wire 100, the covering 120 is stripped off in that place to form the core wire exposed portion (the exposed portion of the core wire). Then, the temporary shape formation process is performed for the terminal-forming target portion 130 in this core wire exposed portion. If the core wire exposed portion is formed in the process of manufacturing the electric wire 100, the temporary shape formation process is performed for the terminal-forming target portion 130 in the core wire exposed portion.

Figure 5:
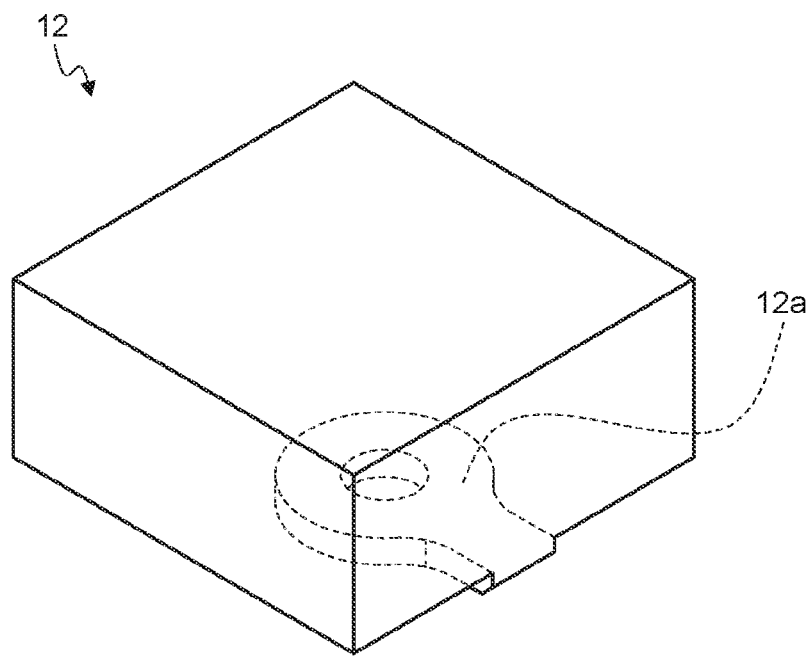
FIG. 5 is a perspective view illustrating a molding die in a pre-molding process.
Figure 5:
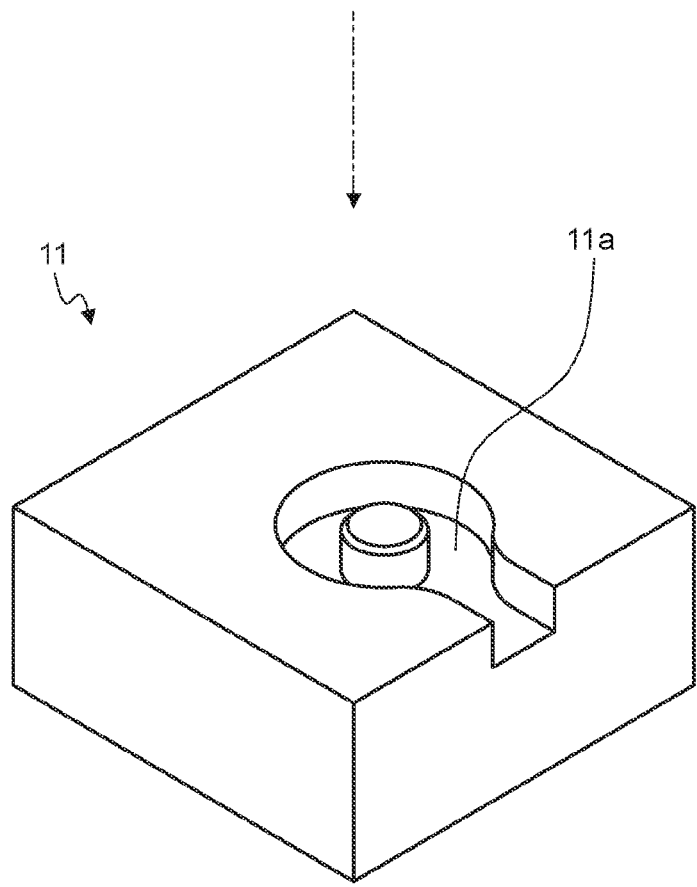
Figure 6:
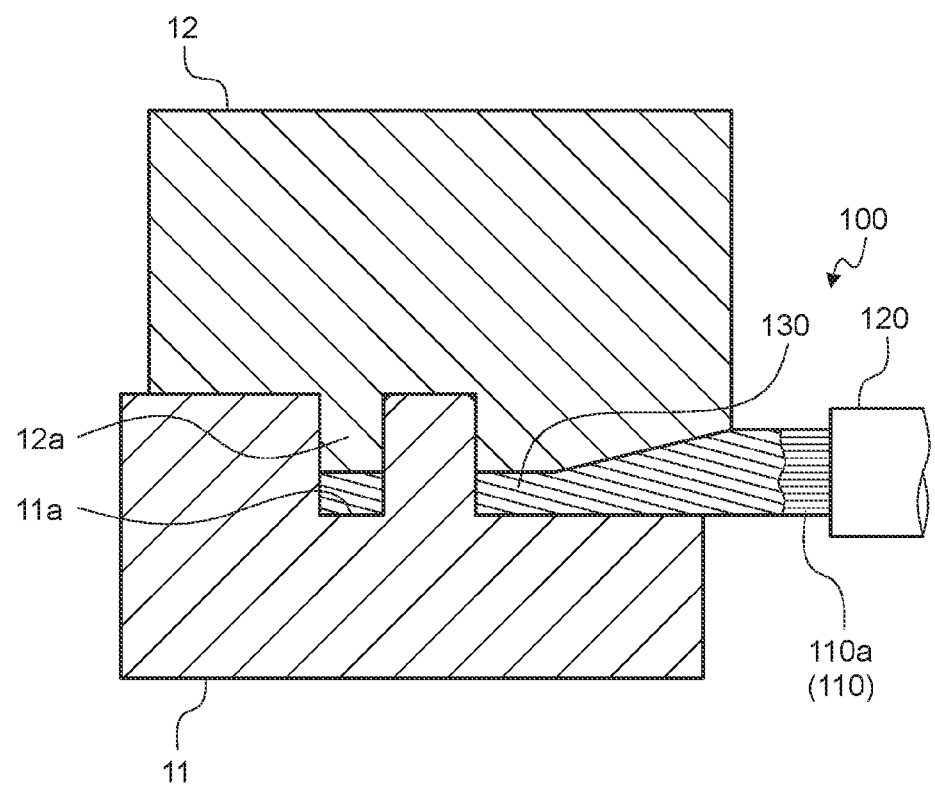
FIG. 6 is a partial cross-sectional view illustrating a portion for describing the pre-molding process.

In this temporary shape formation process, the terminal-forming target portion 130 exposed without a covering 120 is bent in a ring shape, and press-molding is performed for this ring-shaped terminal-forming target portion 130, so that the terminal-forming target portion 130 is formed in a temporary shape of a desired eyelet terminal type. Although not illustrated in detail, in this pre-molding process, a first molding die 11 provided with a trench 11a and a second molding die 12 provided with a protrusion 12a insertable into the trench 11a are used (FIGS. 5 and 6). The first and second molding dies 11 and 12 are molds formed of, for example, metal. The protrusion 12a is inserted into the trench 11a as the dies approach each other. The protrusion 12a is removed from the trench 11a as they are separated. Both the trench 11a and the protrusion 12a are shaped to match the desired eyelets terminal type. In this pre-molding process, the ring-shaped terminal-forming target portion 130 is set in the trench 11a in an insertion state. In addition, in this pre-molding process, by approaching the first and second molding dies 11 and 12, the ring-shaped terminal-forming target portion 130 is crushed between the trench 11a and the protrusion 12a to form the temporary shape of the desired eyelets terminal type (FIG. 3).

Figure 7:
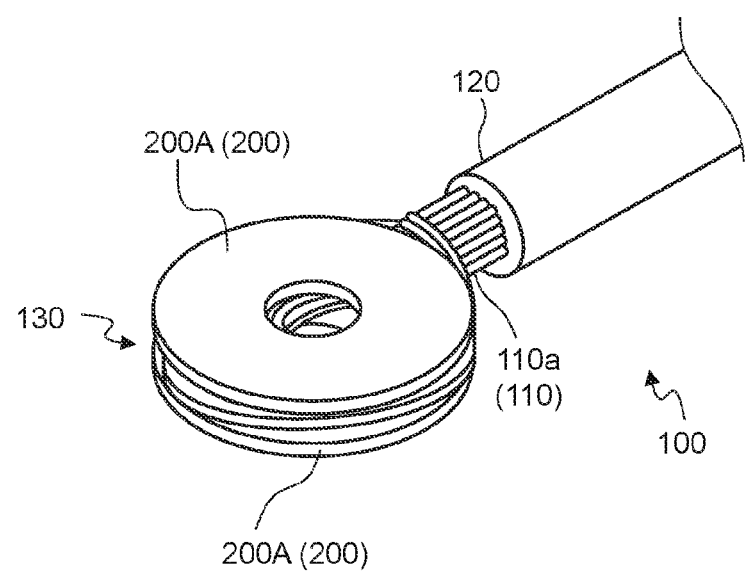
FIG. 7 is a perspective view illustrating a shape of the welding member and placement of the welding member relative to the ring-shaped terminal-forming target portion of the temporary shape according to an embodiment.
Figure 8:
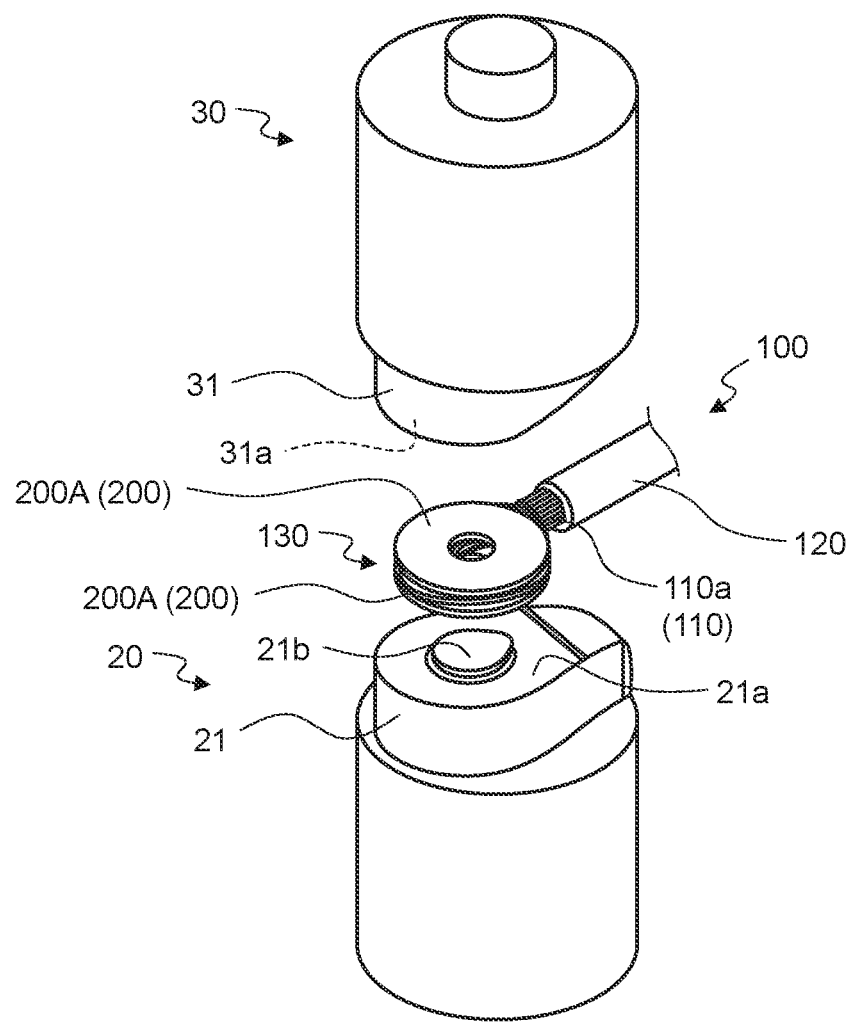
FIG. 8 is a perspective view illustrating a pair of electrodes used in the terminal forming process before pressing.
Figure 9:
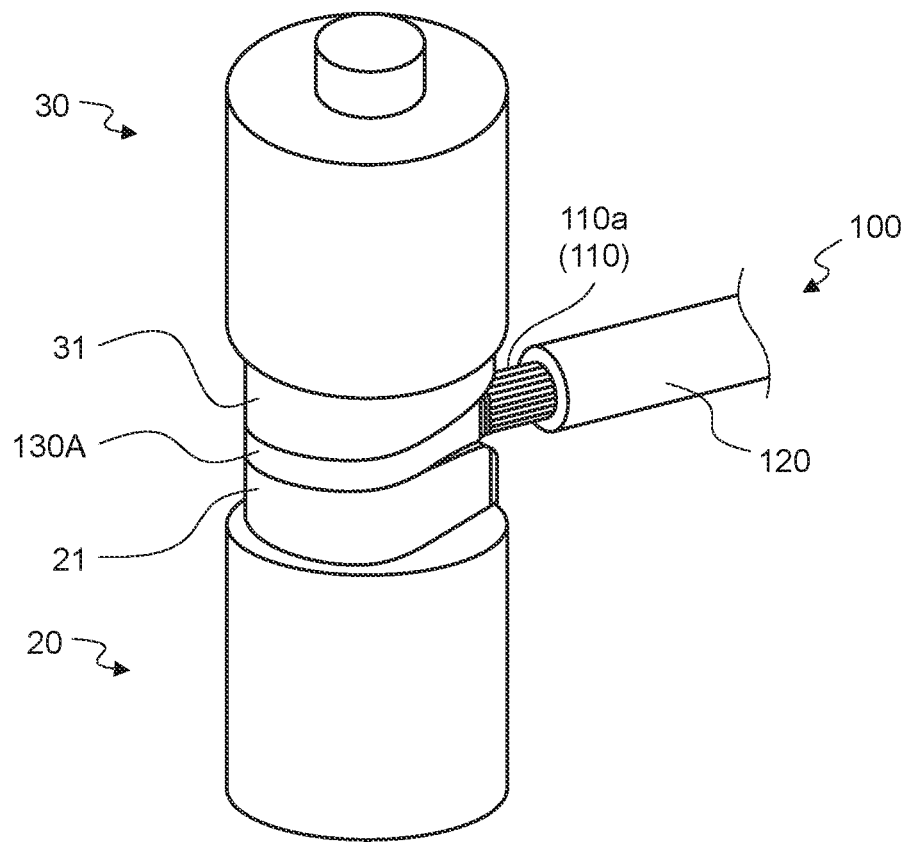
FIG. 9 is a perspective view illustrating the pair of electrodes used in the terminal forming process in a pressed state.

Then, this method of manufacturing the terminal-formed electric wire advances to the welding member placing process. In this example of the welding member placing process, a pair of welding members 200A having a flat ring shape are used as the welding member 200, and the ring-shaped terminal-forming target portion 130 having the temporary shape is interposed between the pair of welding members 200A in a coaxial manner (FIGS. 3 and 7).

Then, this method of manufacturing the terminal-formed electric wire advances to the terminal forming process. In the terminal forming process, a pair of electrodes having a shape corresponding to the desired terminal shape is employed. In this terminal forming process, the exposed terminal-forming target portion 130 is interposed between the pair of electrodes having a shape corresponding to the desired terminal shape. An electric current flows to the pair of electrodes while the terminal-forming target portion 130 is pressed by the pair of electrodes, so that at least the welding member 200 of the terminal-forming target portion 130 is melted. Then, in this terminal forming process, the melted metal is solidified by stopping the electric current flowing to the pair of electrodes. As a result, the terminal-forming target portion 130 formed as a terminal portion 130A having a desired terminal shape. That is, this terminal forming process can be classified into a melting process and a solidifying process for the terminal-forming target portion 130. In this terminal forming process, resistance welding is performed using the first and second electrodes 20 and 30 as the pair of electrodes (FIGS. 8 to 11).

Although not illustrated in detail, the first and second electrodes 20 and 30 form a press electrode configured to shape the terminal-forming target portion 130 into the terminal portion 130A of the desired eyelets terminal type by interposing the ring-shaped terminal-forming target portion 130 (obtained by forming the temporary shape of the desired eyelets terminal type) between the first and second electrodes 20 and 30 and performing pressurizing, heating, and cooling for the terminal-forming target portion 130 in this state. The first and second electrodes 20 and 30 have electrical conductivity and high thermal conductivity, and are constituted of a material having a melting point higher than that of the base material of the strand 110a. The first and second electrodes 20 and 30 are driven such that at least one of them approaches or separates from the counterpart electrode. The first and second electrodes 20 and 30 are placed such that corresponding pressers 21 and 31 described below face each other depending on the driving direction.

Figure 10:
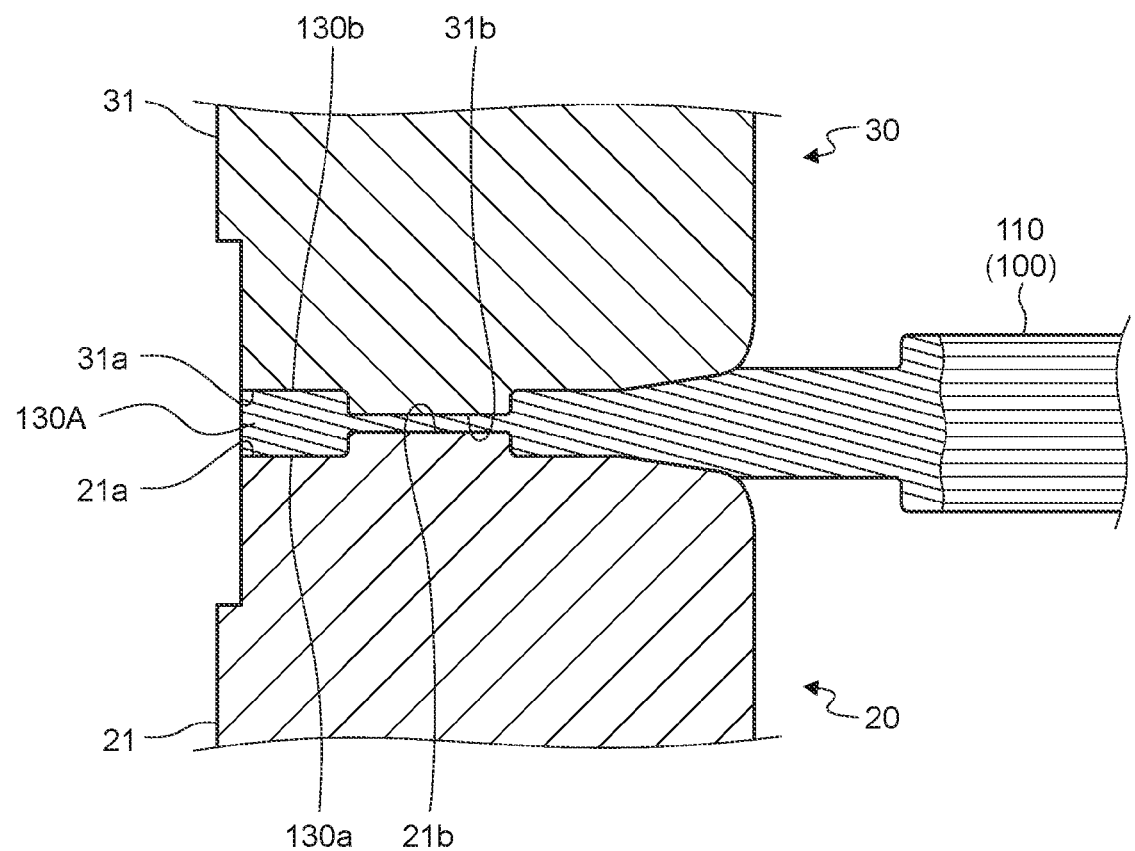
FIG. 10 is a cross-sectional view illustrating the pair of electrodes used in the terminal forming process in a pressed state.

The first electrode 20 has the presser 21 coming into contact with one ring surface side of the ring-shaped terminal-forming target portion 130 of the temporary shape (in this example, one of the ring surfaces of one of the welding members 200A). The presser 21 has a ring-shaped pressing surface 21a capable of covering a ring surface 130a of the terminal-forming target portion 130 approximately in a coaxial manner and a circular column portion 21b placed coaxially with the pressing surface 21a (FIG. 10). The pressing surface 21a is a flat plane formed to have an axial direction corresponding to a driving direction and is formed to be larger than the ring surface 130a in a radial outer side and smaller than the ring surface 130a in a radial inner side. In the terminal forming process, the ring surface 130a comes into contact with this pressing surface 21a. The circular column portion 21b is a part protruding to the second electrode 30 side relative to the pressing surface 21a in the driving direction and is inserted into a radial inner space of the terminal-forming target portion 130. This circular column portion 21b sets a height along the driving direction so as not to come into contact with the second electrode 30 while the pressing surface 21a and the ring surface 130a come into contact with each other. In this example, the ring-shaped terminal-forming target portion 130 of the temporary shape is set on the first electrode 20 by arranging the first electrode 20 such that the pressing surface 21a is directed upward, and the ring surface 130a is placed on the pressing surface 21a.

The second electrode 30 has the presser 31 coming into contact with the other ring surface side of the ring-shaped terminal-forming target portion 130 of the temporary shape (in this example, one of the ring surfaces of the other welding member 200A). The presser 31 has a ring-shaped pressing surface 31a capable of covering a ring surface 130b of the terminal-forming target portion 130 approximately in a coaxial manner and a circular column portion 31b placed coaxially with the pressing surface 31a (FIG. 10). Similar to the pressing surface 21a of the first electrode 20, the pressing surface 31a is a flat plane formed to have an axial direction corresponding to the driving direction and is formed to be larger than the ring surface 130b in a radial outer side and smaller than the ring surface 130b in a radial inner side. This pressing surface 31a is placed to face the pressing surface 21a of the first electrode 20 in the driving direction and in a coaxial manner. In the terminal forming process, the ring surface 130b comes into contact with the pressing surface 31a. The circular column portion 31b is a part protruding to the first electrode 20 side relative to the pressing surface 31a in the driving direction and is inserted into a radial inner space of the terminal-forming target portion 130. This circular column portion 31b sets a height along the driving direction so as not to come into contact with the first electrode 20 while the pressing surface 31a and the ring surface 130b come into contact with each other. In this example, the second electrode 30 approaches the first electrode 20 or separates from the first electrode 20 by arranging the second electrode 30 such that the pressing surface 31a is directed downward and driving the second electrode 30.

In this terminal forming process, after the ring-shaped terminal-forming target portion 130 of the temporary shape is set on the first electrode 20, the second electrode 30 moves to the first electrode 20, so that the ring surfaces 130a and 130b of the terminal-forming target portion 130 are interposed between the pressing surfaces 21a and 31a of the first and second electrodes 20 and 30. In addition, each of the circular column portions 21b and 31b is inserted into a radial inner space of the terminal-forming target portion 130 (FIG. 10). Between the first and second electrodes 20 and 30, the ring surfaces 130a and 130b of the terminal-forming target portion 130 are pressed by the pressing surfaces 21a and 31a, respectively, by a pressing force set or designated to correspond to the core wire 110 and the welding member 200 of the ring-shaped terminal-forming target portion 130 of the temporary shape.

In this terminal forming process, the processing flow advances to the melting process in this pressed state. In the melting process, the first and second electrodes 20 and 30 are electrically conducted at a conduction current value and a conduction time set or designated to correspond to the core wire 110 and the welding member 200. As a result, in this melting process, at least the welding member 200 is melted.

Figure 11:
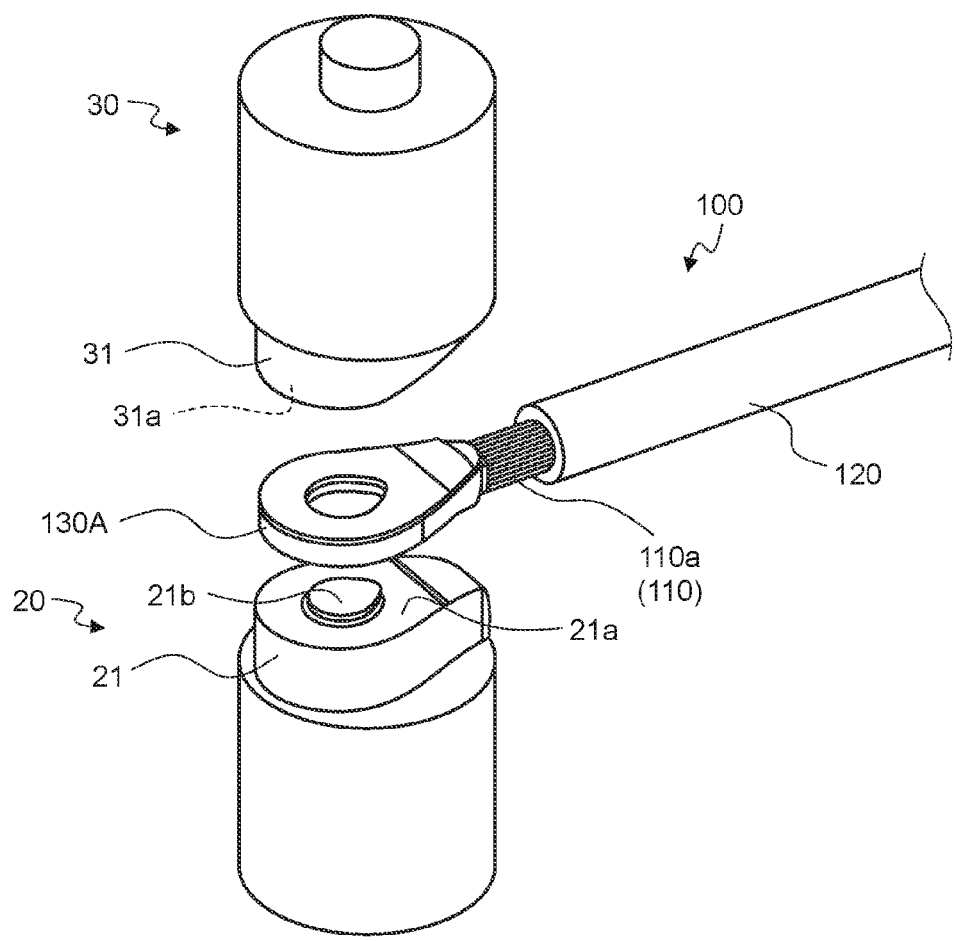
FIG. 11 is a cross-sectional view illustrating the pair of electrodes used in the terminal forming process after the terminal forming is completed.

In this terminal forming process, electrical conduction stops when the set or designated conduction time elapses, and the processing flow advances to the solidification process. In the solidification process, the pressing state for the terminal-forming target portion 130 between the first and second electrodes 20 and 30 is maintained until the solidification time set or designated to correspond to the core wire 110 and the welding member 200 elapses. In this solidification process, the electric conduction stops, and cooling of the terminal-forming target portion 130 starts. In addition, solidification of the melted metal of the terminal-forming target portion 130 starts. In this solidification process, the solidification of the melted metal is terminated until the solidification time elapses, so that the terminal-forming target portion 130 of the temporary shape is formed as the terminal portion 130A. In this terminal forming process, when the solidification time elapses, the second electrode 30 is separated from the first electrode 20 by driving the second electrode 30 (FIG. 11).

In the terminal forming process, the terminal-forming target portion 130 of the electric wire 100 is formed in this manner.

As described above, in the method of manufacturing the terminal-formed electric wire according to the present embodiment, the welding member 200 (200A) melted earlier than the core wire 110 can be entered the gap between the strands 110a by arranging the welding member 200 (200A) having a melting point lower than that of the core wire 110 in the core wire 110 of the terminal-forming target portion 130 in advance. Therefore, even when the strands 110a are not perfectly melted in the terminal forming process, the melted welding member 200 (200A) can connect the strands 110a as it is solidified. In addition, in this method of manufacturing the terminal-formed electric wire, the gap between the strands 110a can be filled with the melted welding member 200 (200A) even when the strands 110a are not perfectly melted in the terminal forming process. Therefore, it is possible to reduce or remove a cavity between the solidified strands 110a. In this manner, in the method of manufacturing the terminal-formed electric wire according to the present embodiment, it is possible to form the terminal portion 130A having a desired shape or strength, compared to a case where only the core wire 110 is fitted. Furthermore, in the method of manufacturing the terminal-formed electric wire according to the present embodiment, the terminal-forming target portion 130 can be formed using the welding member 200 (200A) having a melting point lower than that of the core wire 110. Therefore, it is not necessary to increase the conduction current value or delay the conduction time for the pair of electrodes unlike the background art. For this reason, in the method of manufacturing the terminal-formed electric wire, it is possible to suppress an increase of the manufacturing cost necessary for the terminal forming.

First Modification

In the present modification, compared to the embodiment, the welding member placing process is changed as described below. Depending on this change, other processes are also appropriately changed.

In the method of manufacturing the terminal-formed electric wire according to the present modification, a plurality of strands 110a of the terminal-forming target portion 130 are divided into a plurality of strand groups, and the welding members 200 are placed for this strand group. For this reason, in the method of manufacturing the terminal-formed electric wire, a strand dividing process in which the strands are divided into the strand groups is provided. In the welding member placing process according to the present modification, the strand groups and the welding members 200 are placed alternately.

Figure 12:
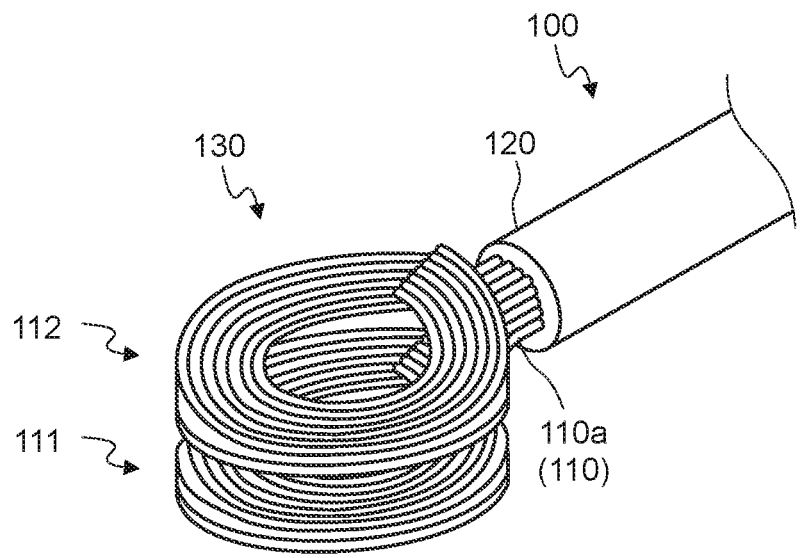
FIG. 12 is a perspective view illustrating the ring-shaped terminal-forming target portion of the temporary shape according to a first modification.

First, in the method of manufacturing the terminal-formed electric wire according to the present modification, a strand dividing process is performed for the exposed terminal-forming target portion 130, and the temporary shape formation process (including the bending process and the pre-molding process) is then performed. In this example, the terminal-forming target portion 130 is divided into two strand groups 111 and 112, and each strand group 111 and 112 is bent in a ring shape, so that the ring-shaped strand groups 111 and 112 are formed into the ring-shaped strand groups 111 and 112, respectively, of the temporary shape (FIG. 12). That is, in the temporary shape formation process of the present modification, the terminal-forming target portion 130 is formed as a molded body corresponding to the temporary shape of the desired eyelets terminal type for each divided strand group 111 and 112. Each ring-shaped strand group 111 and 112 of the temporary shape is placed approximately in a coaxial manner.

Then, in this method of manufacturing the terminal-formed electric wire, the processing flow advances to the welding member placing process. Similar to the embodiment mentioned above, in this welding member placing process, a ring-shaped and flat welding member 200A is used as the welding member 200. The number of welding members 200A is determined depending on an installation place to the ring-shaped strand groups 111 and 112 of the temporary shape.

Figure 13:
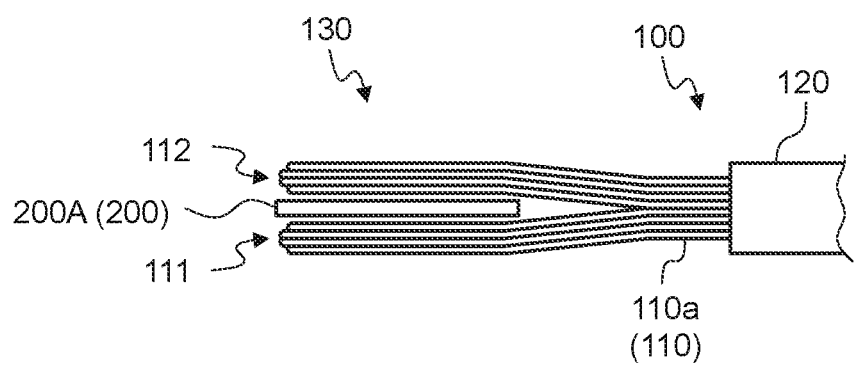
FIG. 13 is a side view illustrating an example of the placement of the welding member relative to the ring-shaped terminal-forming target portion of the temporary shape according to the first modification.
Figure 14:
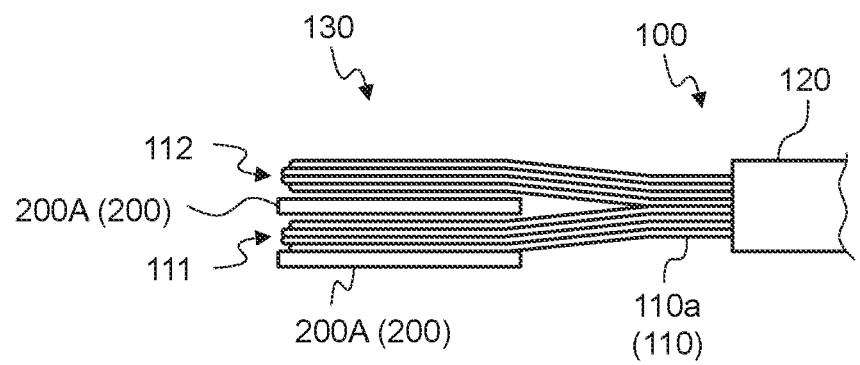
FIG. 14 is a side view illustrating another example of the placement of the welding member relative to the ring-shaped terminal-forming target portion of the temporary shape according to the first modification.
Figure 15:
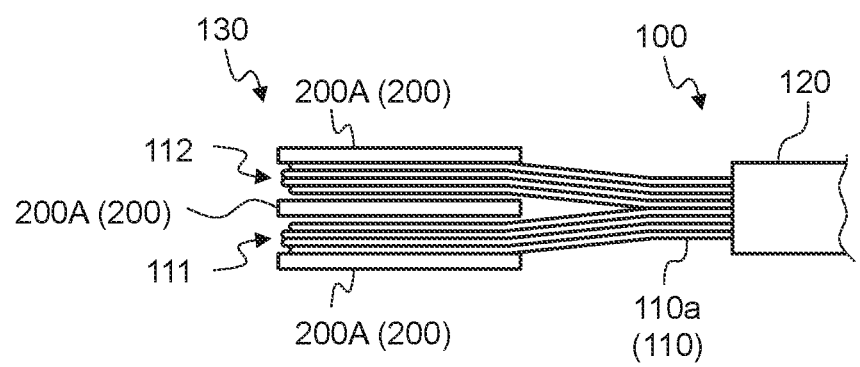
FIG. 15 is a side view illustrating another example of the placement of the welding member relative to the ring-shaped terminal-forming target portion of the temporary shape according to the first modification.

For example, when the welding member 200A is placed between the ring-shaped strand groups 111 and 112 of the temporary shape, a single welding member 200A is prepared. In this case, the welding member 200A is placed between the strand groups 111 and 112 approximately in a coaxial manner, and the welding member 200A is interposed between the strand groups 111 and 112 (FIG. 13). In addition, the welding members 200A may be placed to interpose any one of the ring-shaped strand groups 111 and 112 of the temporary shape approximately in a coaxial manner (FIG. 14). In this case, a pair of welding members 200A are prepared. In FIG. 14, the strand group 111 is interposed between the pair of welding members 200A. In addition, the welding members 200A may be placed interpose each of the strand groups 111 and 112 for each ring-shaped strand group 111 and 112 of the temporary shape approximately in a coaxial manner (FIG. 15). In this case, two welding members 200A may be interposed, or only one welding member 200A may be interposed between the strand groups 111 and 112. In FIG. 15, one welding member 200A is interposed between the strand groups 111 and 112.

Then, in the method of manufacturing the terminal-formed electric wire, the processing flow advances to the terminal forming process. In this terminal forming process, terminal forming is performed for the ring-shaped terminal-forming target portion 130 of the temporary shape in which the strand groups 111 and 112 and the welding member 200A are stacked. This terminal forming process is performed similar to the embodiment, and will not be described here.

In the method of manufacturing the terminal-formed electric wire according to the present modification, it is possible to obtain the same effects as those of the method of manufacturing the terminal-formed electric wire of the embodiment by arranging the welding member(s) 200 (200A) in such positional relationships in advance.

Second Modification

In the present modification, compared to the embodiment, the welding member placing process is changed as described below. Depending on this change, other processes are also appropriately changed.

In the method of manufacturing the terminal-formed electric wire according to the present modification, the welding member 200 is inserted between a plurality of strands 110a in the welding member placing process. This welding member 200 may have any shape as long as it can be inserted between the strands 110a. If this welding member placing process is included in a manufacturing process of the electric wire 100, this welding member placing process may be performed before the terminal forming process and after the manufacturing process of the electric wire 100.

Figure 16:
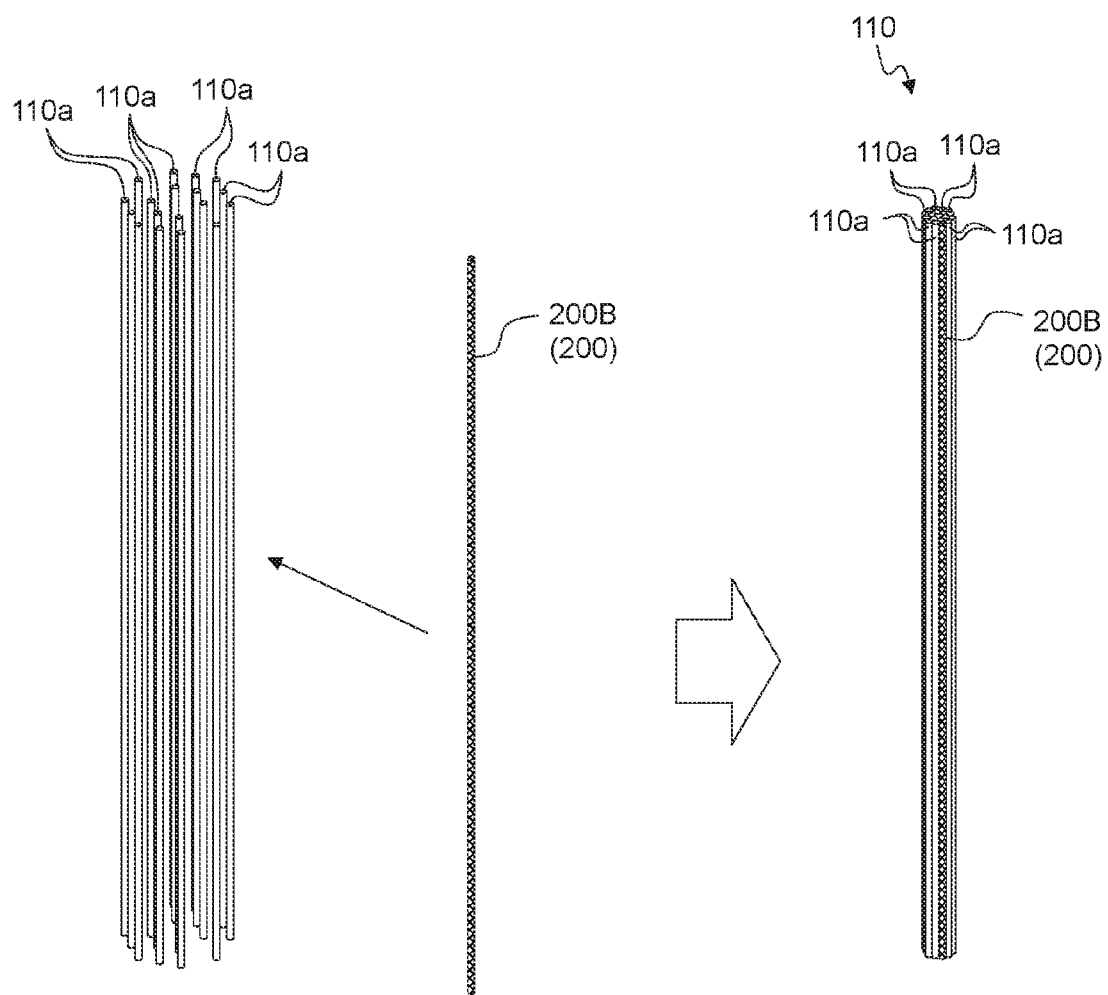
FIG. 16 is a perspective view illustrating a shape of the welding member and the placement of the welding member relative to the core wire according to a second modification.
Figure 17:
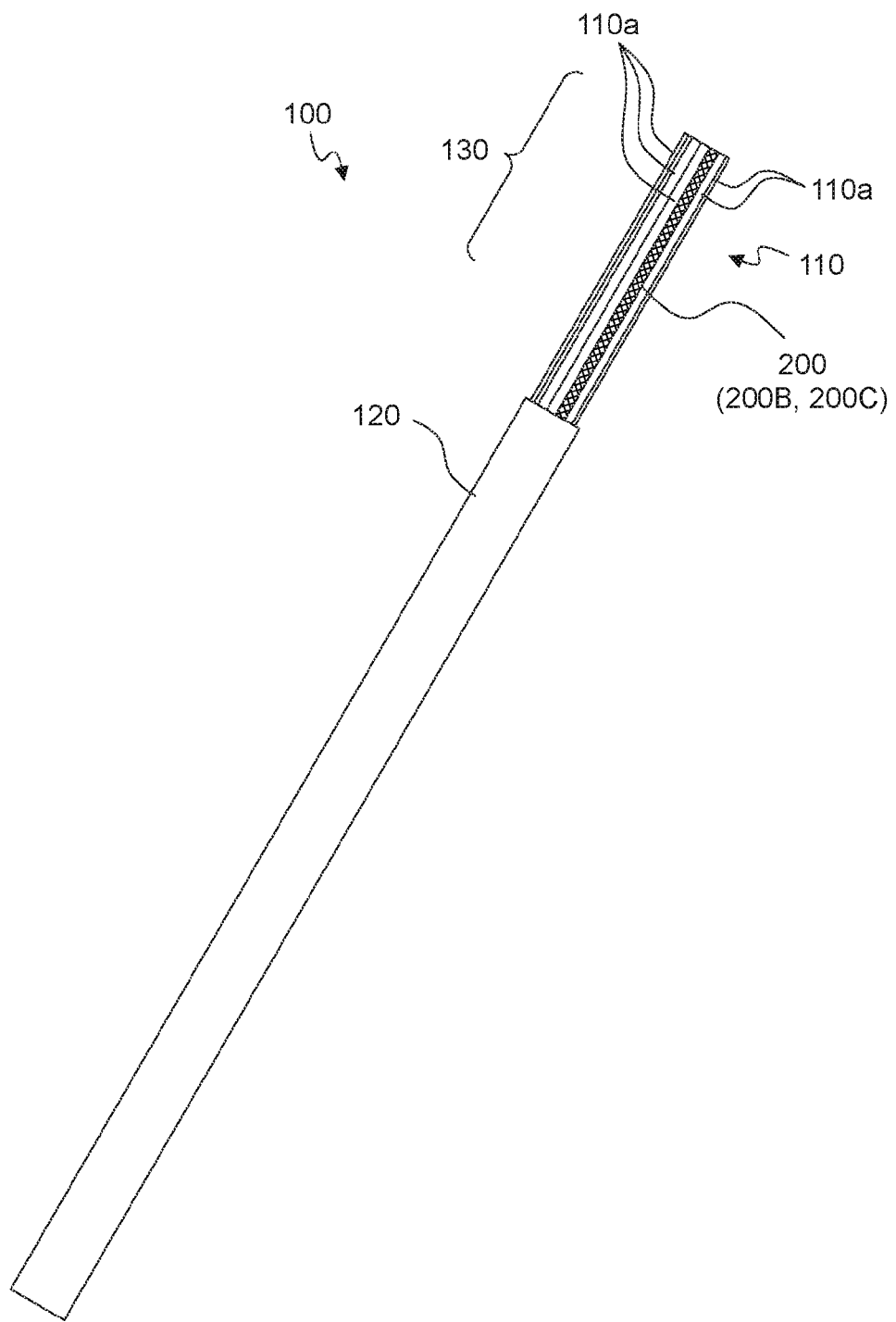
FIG. 17 is a perspective view illustrating a shape of the welding member and the placement of the welding member relative to the terminal-forming target portion according to the second modification.

If the welding member placing process is included in the manufacturing process of the electric wire 100, for example, a wire welding member 200B having the same shape as that of the strand 110a is employed as the welding member 200 (in the left half of FIG. 16), and this welding member 200B is bound with a plurality of strands 110a to form a core wire 110 provided with the welding member 200B (in the right half of FIG. 16). That is, in this case, the welding member placing process is performed in the manufacturing process of the core wire 110. In this case, in the manufacturing process of the electric wire 100, a covering 120 is formed after the manufacturing of the core wire 110 or simultaneously with the manufacturing of the core wire 110. In this case, if the core wire exposed portion is not formed in the manufacturing process of the electric wire 100, the covering 120 of that location is stripped off to form the core wire exposed portion before the temporary shape formation process is progressed. If the core wire exposed portion is formed in the manufacturing process of the electric wire 100, the processing flow advances to the temporary shape formation process. As a result, in this electric wire 100, the welding member 200B is inserted between a plurality of strands 110a at least in the terminal-forming target portion 130 when the temporary shape formation process is performed (FIG. 17). Note that, in each drawing, for convenient description purposes, cross hatching is applied to the welding member 200B, and this welding member 200B is placed in the outer side of a bundle of the strands 110a.

Figure 18:
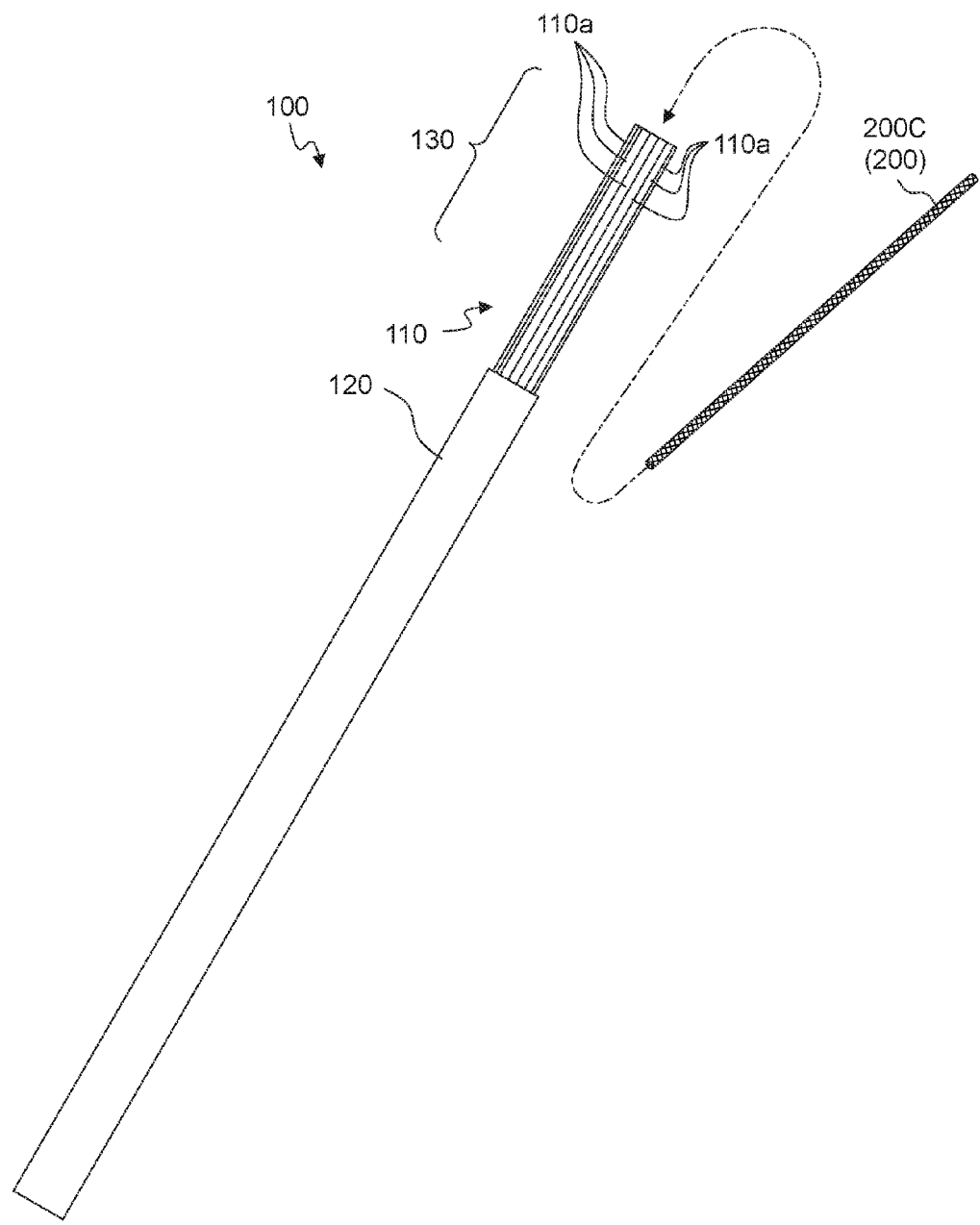
FIG. 18 is a perspective view illustrating another shape of the welding member according to the second modification.

Meanwhile, if the welding member placing process is performed after the manufacturing process of the electric wire 100 and before the terminal forming process, the processing flow is different depending on whether or not the core wire exposed portion is formed in the electric wire 100 after the manufacturing process of the electric wire 100. If the core wire exposed portion is not formed in the manufacturing process of the electric wire 100, the covering 120 in that location is stripped off, and the core wire exposed portion is formed. Then, the processing flow advances to the welding member placing process for the terminal-forming target portion 130 of this core wire exposed portion. In contrast, if the core wire exposed portion is formed in the manufacturing process of the electric wire 100, the processing flow advances to the welding member placing process for the terminal-forming target portion 130 of this core wire exposed portion. In this case, in the welding member placing process, a wire-like welding member 200C having a length equal to or longer than that of the terminal-forming target portion 130 is used as the welding member 200 (FIG. 18). Here, the welding member 200C is formed to be longer than the core wire exposed portion. In this welding member placing process, the welding member 200C is inserted between a plurality of strands 110a at least in the terminal-forming target portion 130 such that a longitudinal direction of the welding member 200C follows an extending direction of each strand 110a (FIG. 17). Note that, in each drawing, for convenient description purposes, cross hatching is applied to the welding member 200C, and this welding member 200C is placed in an outer side of each bundle of the strands 110a.

Figure 19:
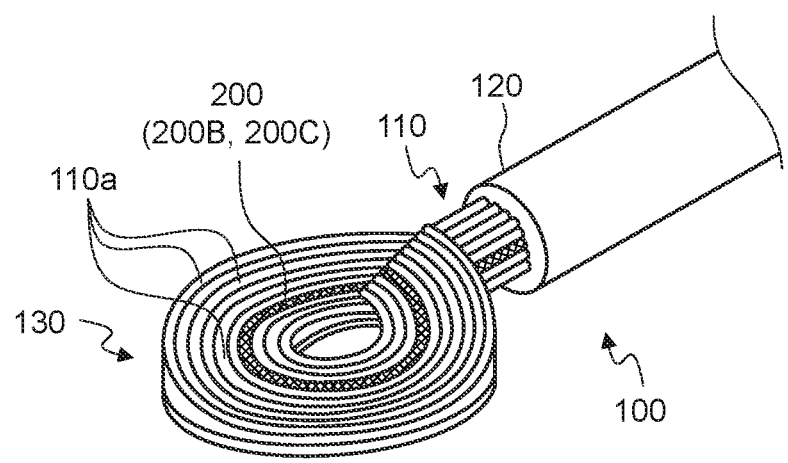
FIG. 19 is a perspective view illustrating an example of the placement of the welding member relative to the ring-shaped terminal-forming target portion of the temporary shape according to the second modification.

In the method of manufacturing the terminal-formed electric wire according to the present modification, the temporary shape formation process (including the bending process and the pre-molding process) is performed for the terminal-forming target portion 130 where the welding member 200 (200B or 200C) is inserted. For this reason, in the ring-shaped terminal-forming target portion 130 of the temporary shape subjected to this formation process, the welding member 200 (200B and 200C) is mixed with a plurality of strands 110a (FIG. 19). In this method of manufacturing the terminal-formed electric wire, the terminal forming process is performed for the ring-shaped terminal-forming target portion 130 of the temporary shape where the welding member 200 (200B or 200C) is mixed. The temporary shape formation process and the terminal forming process are performed similar to the embodiment, and will not be described here. Note that, in the drawings, for convenient description purposes, cross hatching is applied to the welding member 200 (200B or 200C), and this welding member 200 (200B or 200C) is placed in an outer side of each bundle of the strands 110a.

In the method of manufacturing the terminal-formed electric wire according to the present modification, it is possible to obtain the same effects as those of the method of manufacturing the terminal-formed electric wire of the embodiment by inserting the welding member 200 (200B or 200C) between the strands 110a in advance.

Third Modification

In the present modification, compared to the embodiment, the welding member placing process is changed as described below. Depending on this change, other processes are also appropriately changed.

Figure 20:
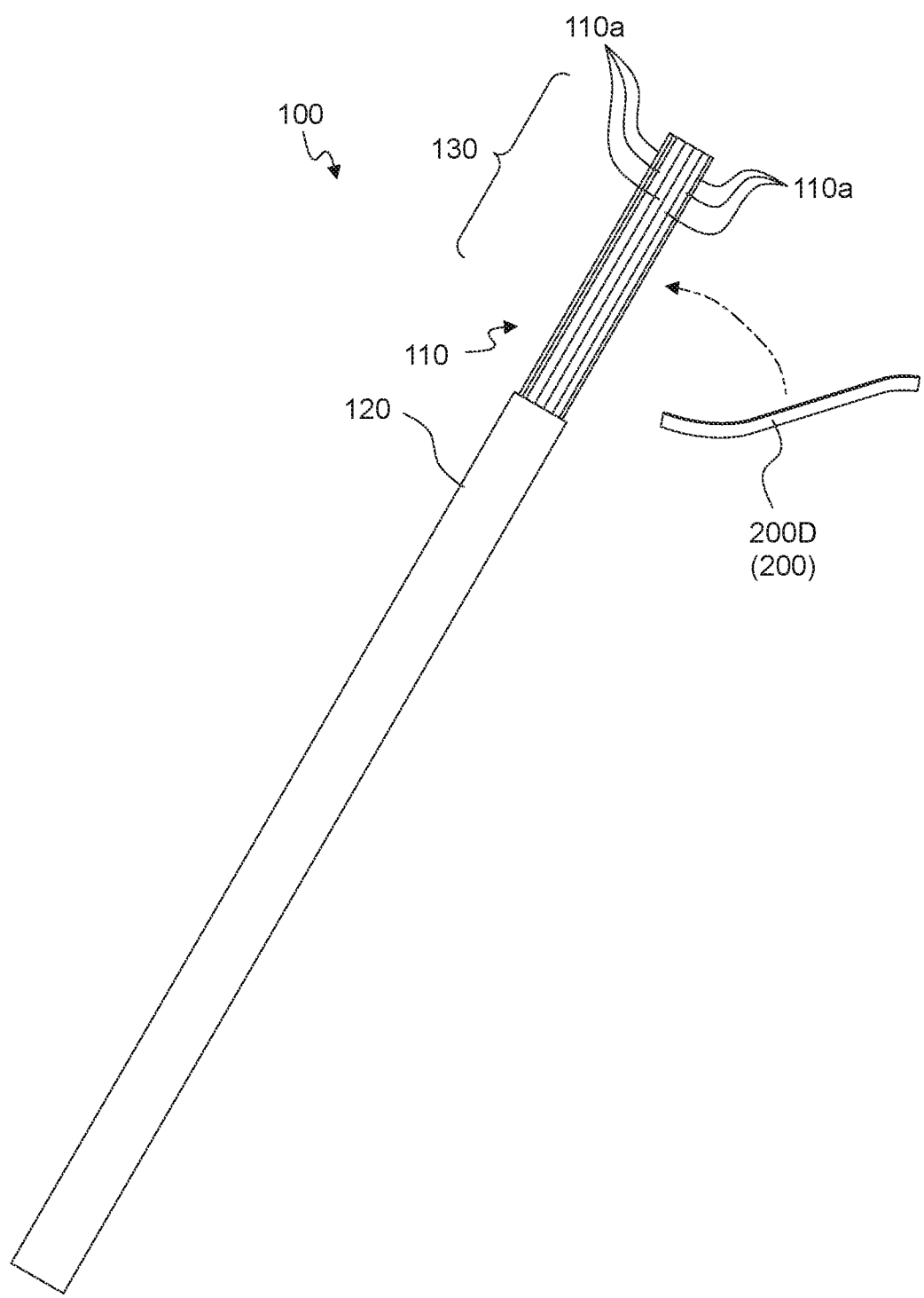
FIG. 20 is a perspective view illustrating a welding member according to a third modification.

In the method of manufacturing the terminal-formed electric wire according to the present modification, the welding member 200 is wound around the core wire 110 in the welding member placing process. In this method of manufacturing the terminal-formed electric wire, a welding member 200D, for example, having a tape shape or a foil shape is employed as the welding member 200 (FIG. 20). If this welding member placing process is included in the manufacturing process of the electric wire 100, the welding member placing process may be performed after the manufacturing process of the electric wire 100 and before the terminal forming process.

Figure 21:
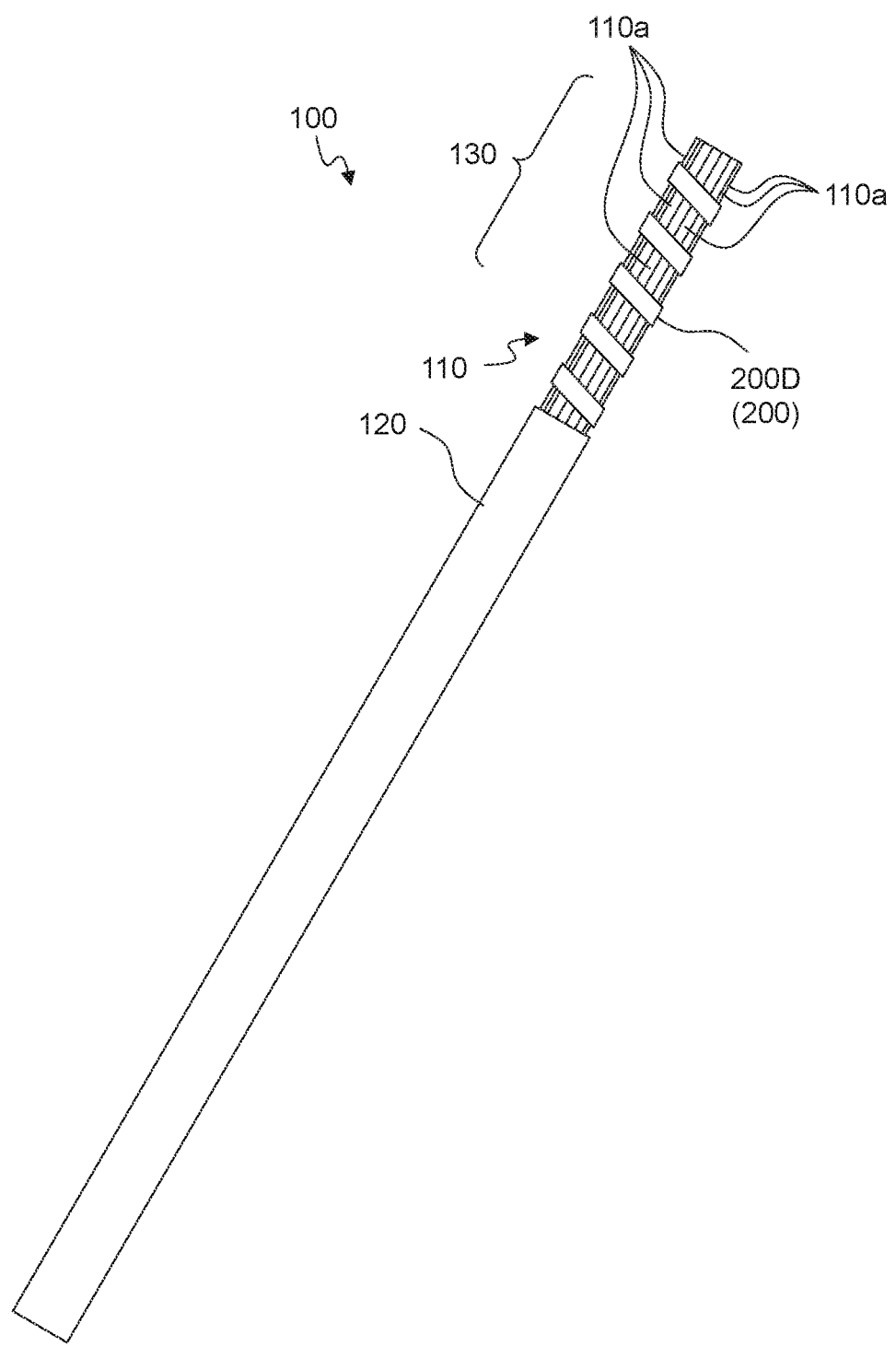
FIG. 21 is a perspective view illustrating an example of the placement of the welding member relative to the terminal-forming target portion according to the third modification.

If the welding member placing process is included in the manufacturing process of the electric wire 100, the welding member 200D is wound around the core wire 110 formed by binding a plurality of strands 110a. In addition, in this manufacturing process of the electric wire 100, the covering 120 is formed on the core wire 110 where the welding member 200D is wound. In this case, if the core wire exposed portion is not formed in the manufacturing process of the electric wire 100, the covering 120 in that location is stripped off to form the core wire exposed portion before the temporary shape formation process. If the core wire exposed portion is formed in the manufacturing process of the electric wire 100, the processing flow advances to the temporary shape formation process. As a result, in this electric wire 100, the welding member 200D is wound around the core wire 110 of at least the terminal-forming target portion 130 when the temporary shape formation process is performed (FIG. 21).

Meanwhile, if the welding member placing process is performed after the manufacturing process of the electric wire 100 and before the terminal forming process, the processing flow is different depending on whether or not the core wire exposed portion is formed in the electric wire 100 after the manufacturing process of the electric wire 100. If the core wire exposed portion is not formed in the manufacturing process of the electric wire 100, the covering 120 in that location is stripped off, and the core wire exposed portion is formed. Then, the processing flow advances to the welding member placing process for the terminal-forming target portion 130 of this core wire exposed portion. In contrast, if the core wire exposed portion is formed in the manufacturing process of the electric wire 100, the processing flow advances to the welding member placing process for the terminal-forming target portion 130 of this core wire exposed portion. In this welding member placing process, the welding member 200D is wound around the core wire 110 formed by binding a plurality of strands 110a in at least the terminal-forming target portion 130 (FIG. 21).

Figure 22:
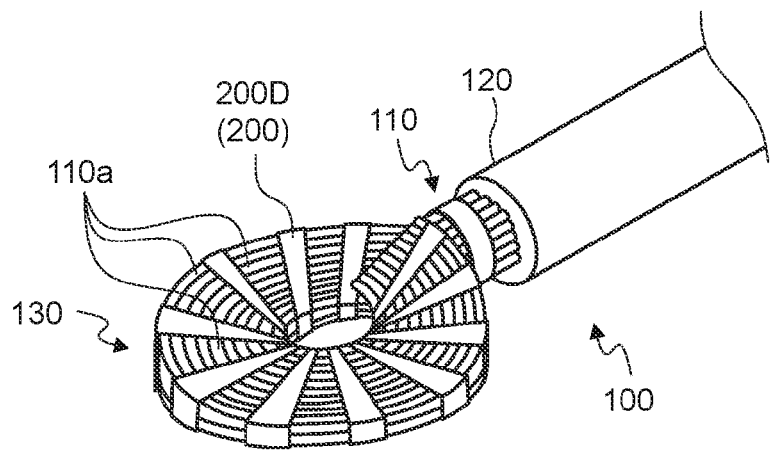
FIG. 22 is a perspective view illustrating an example of the placement of the welding member relative to the ring-shaped terminal-forming target portion of the temporary shape according to the third modification.

In the method of manufacturing the terminal-formed electric wire according to the present modification, the temporary shape formation process (including the bending process and the pre-molding process) is performed for the terminal-forming target portion 130 where the welding member 200 (200D) is wound. For this reason, in the ring-shaped terminal-forming target portion 130 of the temporary shape subjected to this formation process, the welding member 200 (200D) exists on the surface of the core wire 110 (FIG. 22). In this method of manufacturing the terminal-formed electric wire, the terminal forming process is performed for the ring-shaped terminal-forming target portion 130 of the temporary shape where the welding member 200 (200D) exists. The temporary shape formation process and the terminal forming process are performed similar to the embodiment, and will not be described here.

In the method of manufacturing the terminal-formed electric wire according to the present modification, it is possible to obtain the same effects as those of the method of manufacturing the terminal-formed electric wire of the embodiment by winding the welding member 200 (200D) around the core wire 110 in advance.

Fourth Modification

In the present modification, compared to the embodiment, the welding member placing process is changed as described below. Depending on this change, other processes are also appropriately changed.

Figure 23:
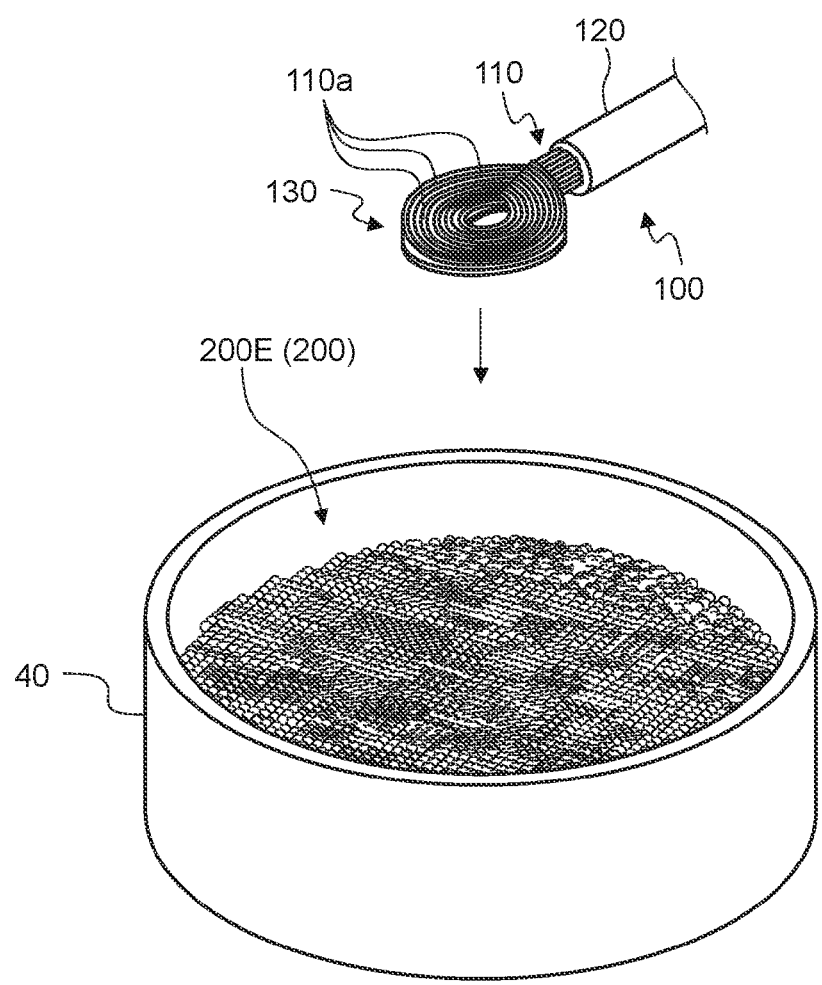
FIG. 23 is a perspective view illustrating a welding member according to a fourth modification.

In the method of manufacturing the terminal-formed electric wire according to the present modification, for example, a welding member 200E having a powder shape is prepared in a container 40 as the welding member 200, and the welding member 200E is applied to the core wire 110 in the welding member placing process (FIG. 23). This welding member placing process is performed after the bending process of the embodiment or after the pre-molding process of the embodiment.

Figure 24:
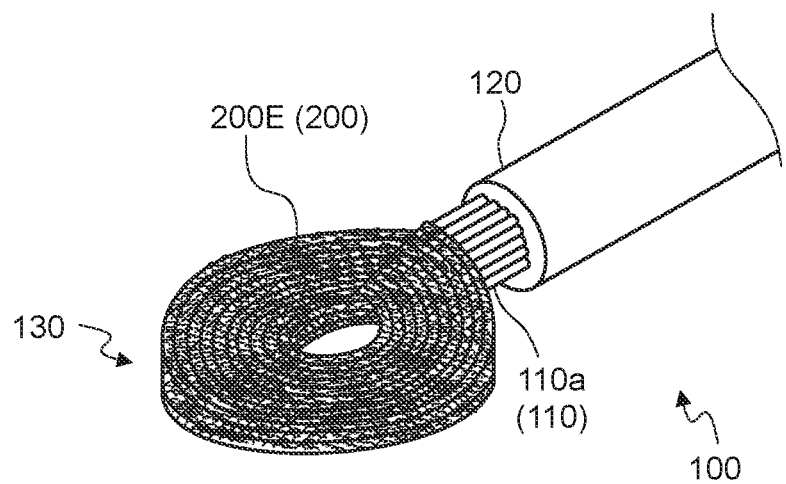
FIG. 24 is a perspective view illustrating an example of the placement of the welding member relative to the ring-shaped terminal-forming target portion of the temporary shape according to the fourth modification.

If the welding member placing process is performed after the bending process, the powder-like welding member 200E is applied to at least the ring-shaped terminal-forming target portion 130 in the welding member placing process. In this case, then, the processing flow advances to the pre-molding process, so that the ring-shaped terminal-forming target portion 130 where the powder-like welding member 200E is attached is molded to the ring-shaped terminal-forming target portion 130 of the temporary shape. Meanwhile, if the welding member placing process is performed after the pre-molding process, the powder-like welding member 200E is applied to at least the ring-shaped terminal-forming target portion 130 of the temporary shape in the welding member placing process. In this case, then, the processing flow advances to the terminal forming process. As a result, the powder-like welding member 200E is attached on the ring-shaped terminal-forming target portion 130 of the temporary shape subjected to the pre-molding process (FIG. 24). The temporary shape formation process (including the bending process and the pre-molding process) is performed similar to the embodiment, and will not be described here.

In the method of manufacturing the terminal-formed electric wire according to the present modification, the terminal forming process is performed for the terminal-forming target portion 130 of the temporary shape, that is, the terminal-forming target portion 130 where the welding member 200 (200E) is attached (FIG. 24). The terminal forming process is performed similar to the embodiment, and will not be described here.

In the method of manufacturing the terminal-formed electric wire according to the present modification, it is possible to obtain the same effects as those of the method of manufacturing the terminal-formed electric wire of the embodiment by applying the welding member 200 (200E) to the core wire 110 in advance.

In the method of manufacturing the terminal-formed electric wire according to the embodiment, the welding member having a melting point lower than that of the core wire is placed in the core wire of the terminal-forming target portion in advance, so that the welding member melted in advance of the core wire can intrude into a gap between the strands in the terminal forming process. For this reason, in this method of manufacturing the terminal-formed electric wire, even when the strand is not perfectly melted in the terminal forming process, the melted welding member can bind the strands as the melted welding member is solidified. In addition, in this method of manufacturing the terminal-formed electric wire, the melted welding member can fill a gap between strands even when the strand is not perfectly melted in the terminal forming process. Therefore, it is possible to reduce or remove a cavity between the solidified strands. In this manner, in the method of manufacturing the terminal-formed electric wire according to the embodiment, it is possible to form the terminal-forming target portion as a terminal portion having a desired terminal shape, compared to a case where only the core wire is formed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a terminal-formed electric wire, the method comprising:
    a strand dividing process in which a plurality of metal strands included in a core wire of a terminal-forming target portion of an electric wire are divided into a plurality of strand groups,
    a welding member placing process in which at least one welding member formed of metal having a melting point lower than that of the plurality of strands is arranged to the core wire of at least the terminal-forming target portion of the electric wire; and
    a terminal forming process in which the exposed terminal-forming target portion is interposed between a pair of electrodes having a shape corresponding to a desired terminal shape, at least the welding member in the terminal-forming target portion is melted by electrically conducting the pair of electrodes while pressing the terminal-forming target portion with the pair of electrodes, and melted metal is solidified by stopping electric conduction to the pair of electrodes, so that the terminal-forming target portion is formed as a terminal portion having the terminal shape, wherein
    in the welding member placing process, the welding member having a flat shape is placed between the adjacent strand groups.

2. A method of manufacturing a terminal-formed electric wire, the method comprising:
    a welding member placing process in which at least one welding member formed of metal having a melting point lower than that of a plurality of metal strands included in a core wire is arranged to the core wire of at least a terminal-forming target portion of an electric wire; and
    a terminal forming process in which the exposed terminal-forming target portion is interposed between a pair of electrodes having a shape corresponding to a desired terminal shape, at least the welding member in the terminal-forming target portion is melted by electrically conducting the pair of electrodes while pressing the terminal-forming target portion with the pair of electrodes, and melted metal is solidified by stopping electric conduction to the pair of electrodes, so that the terminal-forming target portion is formed as a terminal portion having the terminal shape, wherein
    in the welding member placing process, the welding member having the same shape as that of the strand is inserted between the plurality of strands.

* * * * *